Patented Nov. 18, 1947

2,430,867

UNITED STATES PATENT OFFICE 2,430,867

GRANULAR N-SUBSTITUTED POLYAMIDES

Henry D. Foster, Wilmington, Del., and Arthur W. Larchar, Mendenhall, Pa., assignors to E. I. du Pont de Nemours & Company, Wilmington, Del., a corporation of Delaware No Drawing. Application February 9, 1944, Serial No. 521,659

4 Claims. (Cl. 260—72)

This invention relates to polymeric materials and particularly to improvements in the manufacture of modified polyamides in granular form.

The polyamides with which this invention is concerned are of the general kind described in U. S. Patents 2,071,250, 2,071,253 and 2,130,948, in which the average number of carbon atoms in the segments of the chain separating the amide groups is at least two, and which have been further chemically modified. Numerous examples of these polyamides are listed in Table I of U. S. Patent 2,130,948, which teaches further that filament-forming polyamides are prepared by heating the reactants beyond that point where the intrinsic viscosity of the polymer has become 0.4. The modified polyamides which, in accordance with this invention may be prepared in granular form, are the N-alkoxymethyl polyamides. These may be prepared by condensation of an aldehyde and an alcohol with a synthetic polyamide as described in the copending applications of T. L. Cairns, S. N. 445,635, filed June 3, 1942, and S. N. 507,745, filed October 26, 1943, and also in the copending application of H. D. Foster and A. W. Larchar, S. N. 503,130, filed September 20, 1943. A method for obtaining the N-alkoxymethyl polyamides in granular form by adding controlled amounts of water to agitated alcoholic solutions of N-alkoxymethyl polyamide is described in copending application of H. D. Foster and A. W. Larchar, Ser. No. 521,658, filed February 9, 1944. The present invention provides further improvements in the methods of isolating the N-alkoxymethyl polyamides in finely divided granular form.

These improvements are accomplished in accordance with the present invention which comprises adding water to solutions of N-alkoxymethyl polyamides thereby precipitating a layer of resin-containing fluid, separating this resin-containing phase, and subjecting it to treatment with water under conditions hereinafter described to obtain the N-alkoxymethyl polyamide in the form of fine granules.

In one specific embodiment, a dissolved N-alkoxymethyl polyamide, made by acid condensation of a polyamide with formaldehyde and an alcohol, is first neutralized with an alkaline reagent, and is thereafter poured, with mixing, into a large quantity of water (for example 10 parts by weight per part of polymer). This causes the formation of a thick liquid precipitate. The precipitated resin-containing mass is drained off and subsequently worked mechanically with water either on rolls or in a dough mixer. The polymeric mass gradually shrinks, then reaches a doughy consistency. At this stage water is passed through the mixer continuously. As a result the doughy mass gradually stiffens, and thereafter assumes a spongy, somewhat cellular structure. Finally, it breaks up into small granules.

In general it is true that the solubility of an N-alkoxy methyl polyamide in water-alcohol mixtures increases with the degree of substitution of the carbonamide hydrogen by alkoxymethyl groups. The N-alkoxymethyl polyamides which are very highly substituted are difficult to granulate by hitherto available methods, since they precipitate in the form of a compact solid, which is quite difficult to disperse. The N-alkoxymethyl polyamides having a low degree of amide substitution likewise are somewhat difficult to granulate, since they are difficultly soluble, and frequently precipitate in the form of a discrete solid mass which is not readily redispersed. The granulation method of the present invention, however, is applicable to alcohol-soluble N-alkoxymethyl polyamides regardless of the degree of amide substitution. It may be used quite satisfactorily even with the polyamides having a high degree of amide substitution, i. e. polyamides having greater than 40% of the amide hydrogens substituted by alkomethyl groups.

Since the solubility of the N-alkoxymethyl polyamides in water-alcohol mixtures is an important criterion in determining the precise optimum conditions to be used in the granulation of these resins in accordance with this invention, a suitable test, which serves as a control method, is here described. This test is made as follows: 1 gram of polymer is dissolved in 20 cc. of 80% by weight) ethyl alcohol at boiling temperature. Acetone is then titrated into the boiling solution from a burette until the appearance of a slight permanent cloudiness in the solution. The number of cc. of acetone required to produce the cloudiness is called the dilution value.

This invention is particularly valuable in granulating N-alkoxymethyl polyamides having a dilution value between 50 and 100.

The granulation method disclosed in copending application of H. D. Foster and A. W. Larchar, Ser. No. 521,568, filed February 9, 1944, which depends upon redispersion of agglomerated N-alkoxymethyl polyamides is not well suited to granulation of N-alkoxymethyl polyamides having a dilution value higher than about 50, because in such instances the agglomerated mass frequently clings to the agitator as a soft mass which gradually stiffens without redispersing.

The N-alkoxymethyl polyamides are prepared by condensing a synthetic linear polyamide with formaldehyde and an alcohol in the presence of an acid reacting catalyst, preferably an oxygen-containing acid catalyst such as phosphoric acid. Other suitable catalysts include formic, acetic, oxalic, trimethyl acetic, benzoic, sulfuric, p-toluenesulfonic, hydroxyacetic, and maleic acids. The preferred procedure is as follows: 1 part of polyamide, 0.8 to 1.5 parts of formaldehyde, and 1.0 to 2.0 parts of methanol are charged into a pressure vessel equipped with an agitator. The mixture is heated to a temperature of 100° to 150° C., and 0.03 to 0.05 part of phosphoric acid (85%) is injected rapidly (10 to 15 seconds). After a reaction time of about 15 minutes or less (preferably 8 to 12 minutes) the mixture is forced out of the reaction vessel into a quenching bath which preferably is an aqueous methanol solution containing sufficient alkaline reagent, such as ammonia, to neutralize the phosphoric acid. As an example, a satisfactory quenching medium may contain about 2.6 parts of methanol, 0.8 part of water and 0.08 part 28% aqueous ammonia, per part of polyamide. The composition of the quenching medium may be varied, as hereinafter described. The quenched mixture, after filtration or centrifuging to remove a small amount of solid matter, is a clear solution which is ready for use in the granulation operation.

The first step in preparing the granulated resin from the solution is to transfer the solution to a precipitation tank, preferably of closed construction and fitted with an agitator and a conical base. In this tank the quenched solution comes in contact with a volume of water preferably greater than the volume of the filtered quenched solution. For example, 130 parts of water may be mixed into 100 parts of the filtrate at a temperature of 20° to 65° C. As a result a fluid precipitate, which contains about 98% of the resin, is formed. The precipitation is preferably conducted at a temperature of 45° to 55° C., because when resin-containing fluid is formed at this temperature it settles relatively fast, and is not too viscous to be handled in pipe lines. After the precipitation this fluid is quickly withdrawn from precipitating tank, and transferred to the dough mixer where it comes in contact with additional amounts of water, which may be introduced into, and withdrawn from, the mixer either intermittently or continuously. In this operation the water temperature should preferably be 35° C. or lower. Best results are obtained at temperatures below 20° C. As the mixing continues, the polymeric mass assumes a doughy consistency, and later breaks up into small granules. These granules soon become hard particles which can be separated from the mother liquor by any conventional means such as centrifuging, filtering, settling and the like.

If the dilution value of the polyamide is lower than 65 (in the case of N-methoxymethyl polyhexamethylene adipamide this corresponds to amide substitution lower than about 42%), careful control of the precipitation conditions is necessary. It is sometimes helpful in such instances to drain off the water as soon as the polymeric mass begins to form a relatively stiff mass with a crusty surface, and to continue working it without introducing additional water until the granulation commences. Water may then be added and the operations resumed as above described.

The step which requires most careful control is the first step, namely that of converting the fluid slime into the relatively stiff polymeric mass. In general, time for accomplishing this change does not exceed a few minutes. For example, one minute is sufficient for the N-alkoxymethyl polyamides having a dilution value of 45, and about 7 minutes for the N-alkoxymethyl polyamides having a dilution value of 55. If worked too long with water, large, dense chunks which cannot be granulated are formed.

The following examples in which the parts given are parts by weight further illustrate the practice of this invention.

*Example 1.*—One hundred parts of polyhexamethylene adipamide cut to pass a 1/8" screen, 100 parts of paraform, and 150 parts of methanol were heated to 139° C. in an agitated nickel autoclave. A solution containing 3.6 parts of 85% phosphoric acid and 5 parts of methanol was then injected rapidly into the autoclave. The temperature was held at 139° C. for 8 minutes and the contents of the autoclave were discharged into a vessel containing 128 parts of methanol, 40 parts of water, and 8 parts of 28% ammonia. The resulting quenched solution was then filtered to remove a small amount of undissolved polymer.

One hundred eighty-three parts of the filtrate were transferred to a heated, agitated vessel, equipped with a reflux condenser and brought to the boiling point. Two hundred forty parts of 50° C. water were then added slowly, with agitation, over a 1.5-hour period. Agitation was stopped and the slime allowed to settle to the bottom of the vessel, after which the supernatant liquor was decanted off and the slime transferred to a dough mixer. Twenty parts of water were added and the polymer mass worked until fairly stiff and doughy. Water was then passed continuously through the mixer for 110 minutes when the polymer broke up in the form of fine, spongy granules. Water was drained from the product which was then dried in air at 50° C. It had a dilution value of 82, a methoxyl content of 10.3%, a methylol content of 0.4%, and total amide substitution of about 47%.

*Example 2.*—Fifty parts of polyhexamethylene adipamide, 50 parts of paraform, 12.4 parts of water, 57.5 parts of methanol, and 0.058 part of sodium hydroxide were heated to 139° C. in an agitated nickel autoclave, and at this temperature a solution of 5 parts of methanol and 1.8 parts of 85% phosphoric acid was injected. The reaction mixture was held at 136–137° for 8 minutes after the injection of the catalyst and was then discharged into a quench solution consisting of 128 parts of methanol, 40 parts of water, and 4 parts of 28% ammonia. This quenched solution was filtered, and to 200 parts of the filtrate, was added, with agitation, 220 parts of 50° C. water over a period of 15 minutes. The slime was allowed to settle for 5 minutes and was then drained off into a dough mixer. It was worked there for 12 minutes, 20 parts of water was added, and working continued for one minute. The water was then drained off and mixing continued. Seven minutes later the polymer mass broke up in the form of very fine granules. These were then washed with a continuous flow of water through the mixer for one hour. The granular product was centrifuged to remove part of the water and was then dried at 50° C. It had a dilution value of 44, a methoxyl content of 7.0%, methylol content of 1.5%, and a total amide substitution of about 35%.

*Example 3.*—In a steam jacketed, agitated, stainless steel autoclave were placed 100 parts of polyhexamethylene adipamide cut to pass 1/8" screen, 100 parts of paraform, 112.5 parts of methanol, 0.16 part of sodium hydroxide, and 45.8 parts of a solution containing 41.5% formaldehyde, 9.7% water, and 48.8% methanol. This mixture was heated with agitation to 140° C. in 23 minutes and the temperature allowed to drift back to 139° C. Three and six-tenths parts of 85% phosphoric acid was then injected rapidly (10–15 seconds). The reaction mixture was held at 139° C. for 8 minutes after the addition of the catalyst and was then discharged rapidly (less than one minute) into a solution containing 256 parts methanol, 80 parts water, and 8 parts 28% aqueous ammonia. The resulting solution was clarified by filtration and 714 parts of the filtrate transferred to a precipitation tank which was fitted with agitator and which had a conical base. To this filtrate was added in 11 minutes, with agitation, 892 parts of 50° C. water. After settling for 4 minutes, 295 parts of fluid slime was drained from the base of the precipitation tank and transferred to a dough mixer. The slime was then worked for 4 minutes with 50 parts of water to shrink and stiffen the mass so that it would not float away from the space traversed by the mixer blades. Water was then passed continuously through the mixer for 7 minutes. At this point the polymer mass was fairly stiff and the working surface had a jagged appearance. Water addition was stopped and the water drained from the mixer. The polymer mass was then worked without water and, after 6 minutes, broke up in the form of fine granules. The granular product was washed with a continuous flow of water for two hours, and after draining off the water, was dried for 24 hours at 35° C. One hundred one parts of dry product were obtained which had a dilution value of 55.5, a methylol content of 1.15%, a methoxyl content of 8.0%, and a total amide substitution of about 38%.

The polyamides which may be treated by the general method described above include polyhexamethylene adipamide, polyhexamethylene sebacamide, and polyamides derived from epsilon-aminocaproic acid. In general polyamides are linear synthetic resins having a recurring

group (X being oxygen or sulfur). Interpolymers of such polyamides also may be used. In the preparation of N-alkoxymethyl polyamides, alcohols in general condense with formaldehyde and the polyamide, suitable alcohols being methanol, ethanol, isopropanol, n-propanol and allyl alcohol. The higher alcohols frequently require a longer reaction time than do the lower alcohols such as methanol or ethanol. For example, a temperature of 150° C. and a reaction time of 30 minutes are preferred in the condensation of isobutanol with formaldehyde and polyhexamethylene adipamide. It is not necessary, although it is usually preferred, to use the same alcohol in the quenching bath as in the condensation mixture.

Control over the degree of substitution of the carbonamide hydrogens may be by any convenient method such as by limiting the ratio of alcohol or formaldehyde to polyamide in the reaction mixture or by precise control of the time during which the reaction mixture remains acidic and at reaction temperature. This can be done most effectively by keeping the mixture alkaline up until the instant at which the reaction is to be started at the desired reaction temperature, as shown in the examples given above. Another method for controlling the degree of substitution is by varying the amount of water in the condensation mixture. Increasing the water content reduces the amount of substitution. For example, when the condensation mixture contains 0.25 parts of water per 1.0 part of formaldehyde, 1.2 to 1.6 parts of methanol and 1.0 part polyhexamethylene adipamide, the resulting N-methoxymethyl polyhexamethylene polyamide has 35% of its amido hydrogens substituted by methoxyalkyl groups (dilution value of resin=45). On the other hand a condensation mixture of the same composition except that only 0.05 part of water is present gives a product having an amide substitution of 47% (dilution value 80 to 100).

The condensation reaction may be conducted in any suitable apparatus such as a stirred autoclave, made of or lined with acid-resisting materials including nickel, stainless steel, silver, glass, and the like.

The composition of the quenching bath may, with advantage, be varied in accordance with the nature of the condensation product, and particularly with the degree of amide substitution. Obviously, it is economical to use the minimum amount of quench bath which can be used satisfactorily. For example, with N-methoxymethyl polyamides containing 35% amide substitution the quench should contain about 2.6 parts of methanol and 0.8 part of water per part of polyamide used, while a corresponding product containing 45 to 50% amide substitution requires only 1.3 parts of methanol and 0.4 part of water, per parts of polyamide used. These quantities may be varied somewhat, but they represent approximately the minimum amounts of quench which give optimum results.

The granular N-alkoxymethyl polyamides prepared in accordance with this invention are useful in the manufacture of molded products, foils, filaments, bristles, coatings, self-sealing fuel cells, electrical insulation and the like.

It is to be understood that many apparently different embodiments of the present invention may be made without departing from the spirit and scope thereof, and that accordingly we do not limit ourselves except as set forth in the appended claims.

We claim:

1. A process for preparing granular N-alkoxymethyl polyamides having a dilution value of from 50 to 100, which comprises condensing at 100° to 150° C. a polyamide with formaldehyde and a monohydric alkanol having not more than 4 carbon atoms in the presence of an acid catalyst of the class consisting of phosphoric acid, formic acid, acetic acid, oxalic acid, trimethylacetic acid, benzoic acid, sulfuric acid, p-toluenesulfonic acid, hydroxyacetic acid and maleic acid, said polyamide being a linear polymer with recurring intralinear carbonamide groups along the polymeric chain, the average number of carbon atoms in the segments separating the amide groups of the chain being at least 2, quenching the resulting solution of condensation product by mixing it with an alcoholic solution of ammonia, said alcoholic solution containing sufficient alkaline reagent to neutralize the acid catalyst, said alcoholic solution containing as solvent a monohydric alkanol having not more than 4 carbon atoms per molecule, mixing water with the solution thus obtained whereby a precipitation of fluid containing N-alkoxymethyl polyamide is effected, separating the said fluid from the supernatant liquor, stirring the said fluid in the presence of water whereby a stiffened resinous mass is produced, further stirring the said resinous mass in the presence of water until granulation of the resin takes place, hardening the thus produced resin granules by agitation in the presence of water and finally separating the said N-alkoxymethyl polyamide in granular form from the aqueous liquor.

2. A process for preparing granular N-alkoxymethyl polyamides which comprises condensing at 100° to 150° C. a polyamide having a dilution value of from 50 to 100 with formaldehyde and a monohydric alkanol having not more than 4 carbon atoms per molecule, in the presence of an acid catalyst of the class consisting of phosphoric, formic, acetic, oxalic, trimethylacetic, benzoic, sulfuric, p-toluenesulfonic, hydroxyacetic and maleic acids, said polyamide being a linear polymer with recurring intralinear carbonamide groups along the polymeric chain, the average number of carbon atoms in the segments separating the amide groups of the chain being at least 2, quenching the resulting solution by mixing it with an alcoholic solution of ammonia, said alcoholic solution containing sufficient ammonia to neutralize the acid catalyst, said alcoholic solution containing as solvent a monohydric alkanol having not more than 4 carbon atoms per molecule, mixing water at a temperature in the range of 20° to 65° C. with the thus obtained quenched solution whereby a precipitation of fluid containing N-alkoxymethyl polyamide is effected, separating the said fluid from the supernatant liquor, stirring the fluid in the presence of water at a temperature below 35° C. whereby a stiffened resinous mass is produced, further stirring the said resinous mass until granulation takes place, hardening the thus produced resin granules by agitation in the presence of water, and finally separating the said N-alkoxymethyl polyamide in granular form from the aqueous liquor.

3. A process for preparing granular N-alkoxymethyl polyamides having a dilution value of from 50 to 100 which comprises condensing at 100° to 150° C. a linear polyamide, in which the average number of carbon atoms in the segments separating the amide groups is at least 2, with formaldehyde and a monohydric alkanol having not more than 4 carbon atoms in the presence of a catalytic quantity of phosphoric acid, said polyamide being a linear polymer with recurring intralinear carbonamide groups along the polymeric chain, the average number of carbon atoms in the segments separating the amide groups of the chain being at least 2, quenching the resulting solution by mixing it with an alcoholic solution of ammonia, said alcoholic solution containing sufficient ammonia to neutralize the phosphoric acid catalyst, said alcoholic solution containing as solvent, a monohydric alkanol having not more than 4 carbon atoms per molecule, mixing water at a temperature in the range of 45° to 55° C. with the thus obtained quenched solution whereby a precipitation of fluid containing N-alkoxymethyl polyamide is effected, separating the said fluid from the supernatant liquor, stirring the fluid in the presence of water at a temperature below 20° C. whereby a stiffened resinous mass is produced, further stirring the said resinous mass until granulation takes place, hardening the thus produced resin granules by agitation in the presence of water, and finally separating the said N-alkoxymethyl polyamide in granular form from the aqueous liquor.

4. A process for preparing granular N-methoxymethyl polyamides having a dilution value of from 50 to 100 which comprises heating in a closed vessel at a reaction temperature in the range of 100° to 150° C. 1 part of polyamide, 0.8 to 1.5 parts of formaldehyde and 1.0 to 2.0 parts of methanol, said polyamide being a linear polymer with recurring intralinear carbonamide groups along the polymeric chain, the average number of carbon atoms in the segments separating the amide groups of the chain being at least 2, introducing into this mixture at the said reaction temperature 0.03 to 0.05 part of 85% phosphoric acid, stopping the condensation reaction after a reaction time of from 8 to 15 minutes by quenching the reaction mixture in an aqueous methanol solution containing sufficient ammonia to neutralize the phosphoric acid, mixing water at a temperature in the range of 45° to 55° C. with the thus obtained quenched solution whereby a precipitation of fluid containing N-alkoxymethyl polyamide is effected, separating the said fluid from the supernatant liquor, stirring the fluid in the presence of water at a temperature below 20° C. whereby a stiffened resinous mass is produced, further stirring the said resinous mass until granulation takes place, hardening the thus produced resin granules by agitation in the presence of water, and finally separating the said N-alkoxymethyl polyamide in granular form from the aqueous liquor.

HENRY D. FOSTER.
ARTHUR W. LARCHAR.

REFERENCES CITED

The following references are of record in the file of this patent:

UNITED STATES PATENTS

| Number | Name | Date |
|---|---|---|
| 2,244,184 | Austin et al. | June 3, 1941 |
| 2,173,005 | Strain | Sept. 12, 1939 |

FOREIGN PATENTS

| Number | Country | Date |
|---|---|---|
| 542,128 | Great Britain | Dec. 29, 1941 |

Certificate of Correction

Patent No. 2,430,867. November 18, 1947.

HENRY D. FOSTER ET AL.

It is hereby certified that error appears in the printed specification of the above numbered patent requiring correction as follows: Column 2, line 50, for "Ser. No. 521,568" read *Ser. No. 521,658*; and that the said Letters Patent should be read with this correction therein that the same may conform to the record of the case in the Patent Office.

Signed and sealed this 27th day of January, A. D. 1948.

[SEAL]

THOMAS F. MURPHY,
*Assistant Commissioner of Patents.*